United States Patent
Hassan

(10) Patent No.: US 8,046,556 B2
(45) Date of Patent: *Oct. 25, 2011

(54) DETECTION OF OUT-OF-MEMORY AND GRACEFUL SHUTDOWN

(75) Inventor: Ahmed Hassan, Kingston (CA)

(73) Assignee: Research In Motion Limited, Waterloo, Ontario (CA)

( * ) Notice: Subject to any disclaimer, the term of this patent is extended or adjusted under 35 U.S.C. 154(b) by 494 days.

This patent is subject to a terminal disclaimer.

(21) Appl. No.: 11/851,586

(22) Filed: Sep. 7, 2007

(65) Prior Publication Data

US 2008/0005523 A1    Jan. 3, 2008

Related U.S. Application Data

(63) Continuation of application No. 10/874,291, filed on Jun. 24, 2004, now Pat. No. 7,284,099.

(30) Foreign Application Priority Data

Jun. 24, 2003  (EP) .................................... 03253973

(51) Int. Cl.
*G06F 13/10* (2006.01)
(52) U.S. Cl. ...................................................... 711/163
(58) Field of Classification Search ........................ None
See application file for complete search history.

(56) References Cited

U.S. PATENT DOCUMENTS

| 5,274,813 | A | 12/1993 | Itoh |
| 6,938,254 | B1 * | 8/2005 | Mathur et al. ................. 718/104 |
| 7,293,105 | B2 * | 11/2007 | Benedetto et al. ............. 709/238 |
| 2003/0174067 | A1 * | 9/2003 | Soliman .................... 340/870.02 |
| 2004/0088498 | A1 * | 5/2004 | Accapadi et al. .............. 711/147 |

FOREIGN PATENT DOCUMENTS

| WO | WO 01/84320 A2 | 11/2001 |
| WO | WO 03/038616 A2 | 5/2003 |

OTHER PUBLICATIONS

Henning M., Vinoski S: "Advanced CORBA Programming with C++", pp. 91-94, 379-382, Addison-Wesley, second printing Apr. 1999.

Inside Macintosh, Addison-Wesley Publishing Company, 1992.

* cited by examiner

*Primary Examiner* — Duc Doan

(74) *Attorney, Agent, or Firm* — Rowand Intellectual Property Law

(57) ABSTRACT

A method, system and computer readable medium for managing low memory in a first computing device are provided. The system is configured to cause part of the memory allocated to a specialized application to be held in reserve so that it can be used to support the specialized application during an occurrence of low memory, thus providing time for data backup or remedial steps to be carried out before the affected application crashes.

25 Claims, 3 Drawing Sheets

DETECTION OF OUT-OF-MEMORY AND GRACEFUL SHUTDOWN

RELATED APPLICATION DATA

The present application is a continuation of U.S. patent application Ser. No. 10/874,291, filed Jun. 24, 2004, which claims priority to European Patent Application No. 03253973.6, filed Jun. 24, 2003.

TECHNICAL FIELD

The present disclosure relates to memory management in computing devices.

BACKGROUND

As known in the art, operating systems such Microsoft™ Windows™ and UNIX based systems have a physical limit on the amount of addressable memory that can be used by an application. If the application exceeds this limit, it will often crash, leading to a loss of data that has not been stored to persistent memory, and perhaps also to crashes or slowdowns in any other applications that rely on the crashed application. In distributed computing networks in which separate computers connected to a common network perform work in parallel, one computer may be configured to monitor its own memory usage or the memory usage of other computers and take precautionary backup measures, either automatically or after alerting a human operator, in the event that the monitored conditions of one of the computers indicates that an application crash has occurred or is about to occur. However, such a system requires almost near constant polling of the monitored computers in order to have timely detection of a problem, and even with timely detection, the affected computer application may crash before critical data can be saved.

Accordingly, a method and system for detecting and managing low memory situations that provides time for rectifying or otherwise responding to the situation is desirable.

BRIEF DESCRIPTION OF THE DRAWINGS

Embodiments of the present disclosure will now be described, by way of example only, with reference to the attached Figures, wherein.

Figure 1:
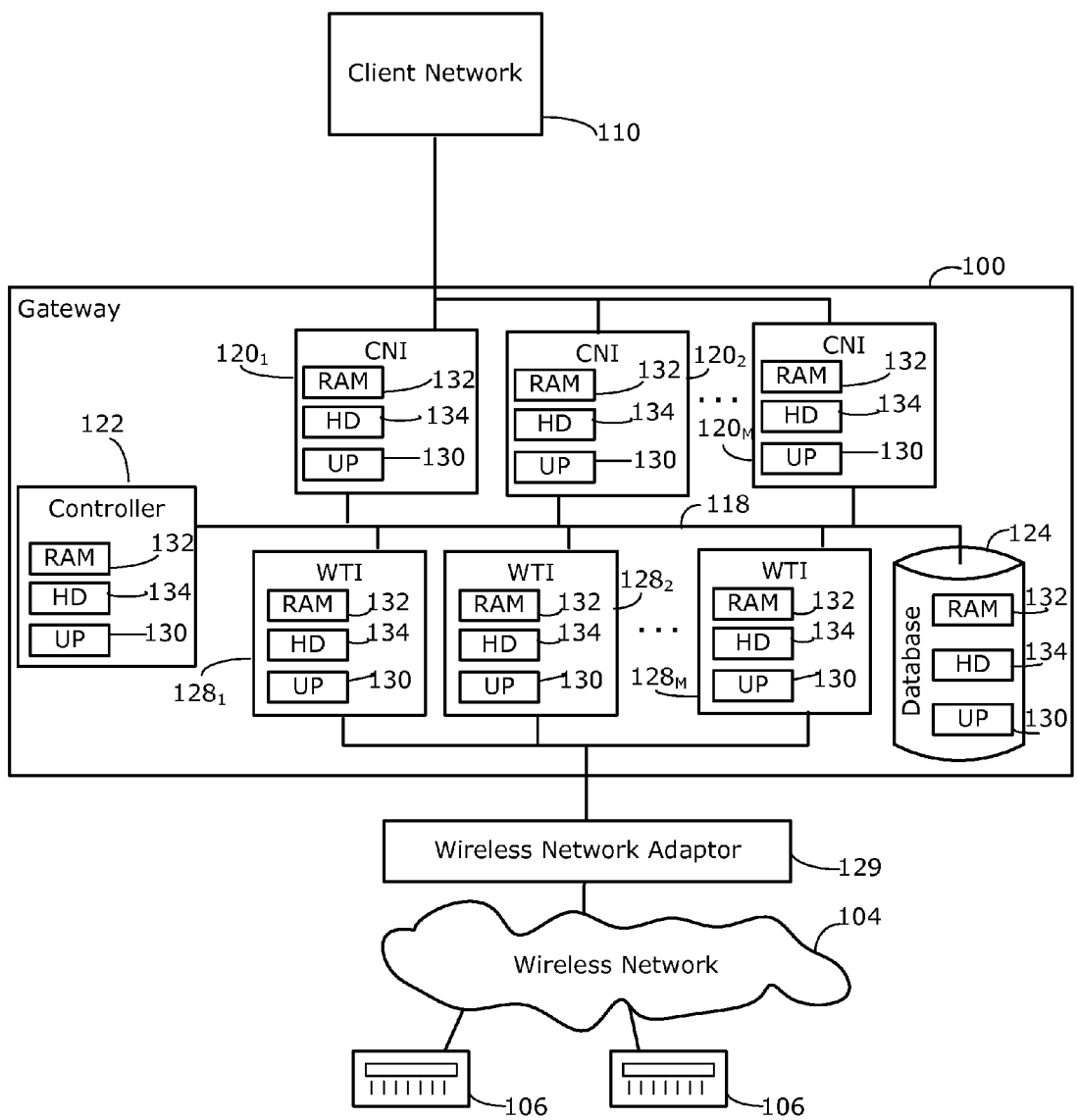
FIG. 1 is a block diagram showing a communications system including a computer network in which the present disclosure is implemented according to embodiments of the present disclosure.

Similar references are used in different figures to denote similar components or features.

DETAILED DESCRIPTION OF EXAMPLE EMBODIMENTS

The present disclosure provides a method by which warning of an impending out-of-memory problem can be provided sufficiently early to allow corrective or remedial action to be taken before the crash of an application.

In accordance with one example embodiment of the present disclosure, there is provided a method for managing low memory in a first computing device having a processor for executing an operating system and an application, and a memory available to the operating system and application, the operating system being configured to issue a first out-of-memory exception in the event that available memory for the application falls below a first pre-determined threshold, the method comprising: reserving within a block of memory a first reserve buffer that is unavailable to the application until released; and releasing the first reserve buffer for use by the application upon detecting the first out-of-memory exception generated by the operating system.

In accordance with another example embodiment of the present disclosure, there is provided a system for managing low memory on a first computing device having a processor for executing an operating system and an application, and a memory available to the operating system and application, the operating system being configured to issue a first out-of-memory exception in the event that available memory for the application falls below a first pre-determined threshold, the system comprising: a low memory manager configured to reserve within a block of memory a first reserve buffer that is unavailable to the application until released, and release the first reserve buffer for use by the application upon detecting the first out-of-memory exception generated by the operating system.

In accordance with a further example embodiment of the present disclosure, there is provided a computer program product comprising a computer readable medium having stored thereon computer program instructions for managing low memory in a first computing device having a processor for executing an operating system and an application, and a memory available to the operating system and application, the operating system being configured to issue a first out-of-memory exception in the event that available memory for the application falls below a first pre-determined threshold, the computer executable instructions comprising instructions for: reserving within a block of memory a first reserve buffer that is unavailable to the application until released; releasing the first reserve buffer for use by the application upon detecting the first out-of-memory exception.

The following detailed description of the embodiments of the present disclosure does not limit the implementation of the present disclosure to any particular computer operating system (OS). The present disclosure may be implemented with any OS that provides the facilities that support the requirement of the present disclosure. One embodiment is implemented using the Microsoft™ Windows™ XP™ operating system, however the present disclosure could be implemented with other operating systems, for example UNIX.

Referring to the drawings, FIG. 1 is a block diagram of a communications system that includes a networked computer system in which the present disclosure may be implemented. The networked computer system shown is a router, and more particularly, a wireless gateway 100 that functions as an intermediary and interpreter between one or more client networks 110 and one or more wireless networks 104, allowing email messages to be exchanged between mobile devices 106 within the wireless network 104 and devices connected to the client network 110. The present disclosure is not however limited to implementation in a router or wireless gateway, and in its broader aspects can be implemented in a wide range of computer systems.

The client network 110 will often be remotely located from the wireless gateway 100 and communicates over one or more communications links with the wireless gateway 100. Client network 110 will typically include a client side interface for handling email communications with the gateway 100. The email messages may, as well known in the art, include, among other things, plain text messages, HTML messages, and attached files of a wide variety of types.

The wireless gateway 100 provides translation and routing services between one or more client networks 110 and wireless networks 104 to facilitate email communication between mobile devices 106 and devices connected, directly or indirectly, to client network 110. The wireless gateway 100 includes several distributed components including, among other things, client network interfaces (CNIs) $120_1$-$120_M$, at least one controller 122, a database (DB) 124, and wireless transport interfaces (WTIs) $12_1$-$128_M$. In order to provide increased capacity and backup redundancy when required, the components are each preferably implemented using dedicated digital computers that are connected by a network 118 (which may be a dedicated LAN). As known in the art, the digital computer components each include, among other things, a microprocessor 130, a transient memory such as RAM 132, typically a persistent writable memory such as a flash memory and/or hard drive (HD) 134, and network communications interface cards (not shown). If one component, for example, wireless transport interface $128_k$ (where $1 \leq k \leq M$) crashes or otherwise becomes unavailable, another one or more of wireless transport interfaces $128_1$-$128_M$ in the wireless gateway 100 can pick up the traffic formerly handled by the failed wireless transport interface.

In the gateway 100 of FIG. 1, the client network interfaces (CNI) 120 are each configured to manage the connection between the wireless gateway 100 and at least one client network 110. In one embodiment, the client network interfaces (CNI) 120 maintain an open connection with one or more client side interfaces (not shown) at the client network 110 and communicate therewith using a defined protocol.

The database 124 of the wireless gateway 100 stores data used by the other components of the wireless gateway for administrative, tracking and message recovery purposes, and in this regard a number of the components of the wireless gateway 100 are configured to write to and read from the database 124. Among other things, the database stores configuration information for the wireless gateway components (120, 122, 128), keeps data as to the current status and state of the wireless gateway 100, stores information (including ID numbers and last known location) about the mobile devices 106 that communicate with the wireless gateway 100, and stores information about selected messages (not shown). The information stored by the database 124 assists with disaster/error recovery and can permit a backup component to take over the functions of a component that fails. In one possible embodiment, the database 124 is an Oracle™ database, and the wireless gateway components run Oracle™ clients that allows them to write to and read from the database.

The wireless gateway 100 includes at least one controller in the form of controller 122, and preferably a backup controller (not shown) as well, for controlling and coordinating operation of the gateway. Among other things the controller 122 monitors the operation of the components (120, 124, 128) of gateway 100 by periodically polling the components for current state information, which the controller 122 stores in the database 124. The controller 122 is configured to detect the failure or pending failure of components within the wireless gateway and coordinate other components to take over the functions of failed components.

The wireless transport interfaces (WTI) 128 are the wireless gateway's interface to the mobile devices 106, and assemble messages (not shown) that are destined for mobile devices 106 into sequences of packets, the format of which is dependent on the specific wireless network 104. Similarly, the wireless transport interfaces (WTI) 128 recombine messages from mobile devices 106 from sequences of packets sent from the mobile devices 106.

The wireless transport interfaces 128 will typically communicate with the wireless network 104 through one or more wireless network interface adaptors 129. In one embodiment, wireless network interface adaptors 129 have a TCP/IP connection to wireless transport interfaces 128 and an X.25 protocol connection to wireless network 104 such that the wireless network interface adaptors route packets from the wireless transport interfaces 128 over a TCP/IP connection to an X.25 mobile network connection and vice versa.

Mobile network 104 provides radio coverage to mobile devices 106, and may be a number of different types of network, including for example, Mobitex Radio Network, DataTAC, or a GPRS, CDMA, or iDEN network. Mobile devices 106 may be handheld or other mobile digital computing devices that are configured to send and receive email messages.

The present disclosure is not dependent on the particular protocol or methodologies used in gateway 100 to exchange messages between client network 110 and the wireless network 104. Rather, the present disclosure relates to aspects of memory management of one or more or the computers that are used to implement networks such as gateway 100.

Figure 2:
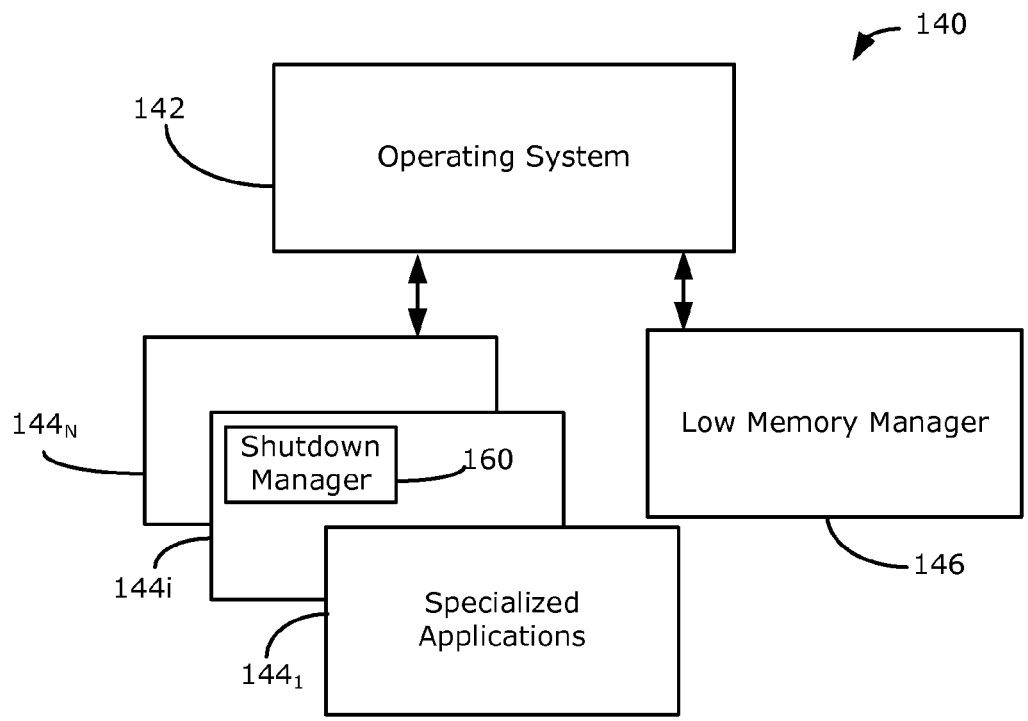
FIG. 2 is a block diagram representation of software components implemented on computers of the computer network of FIG. 1.

FIG. 2 shows a block diagram representation of software components, indicated generally by reference 140, that are either resident on or accessible to at least some of the components such as the wireless transport interfaces (WTIs) 128, client network interfaces (CNIs) 120, controller 122 and database 124 of the gateway 100, for execution by microprocessors 130. The software components include an operating system (OS) 142, which as noted above is of the Microsoft™ Windows™ family of operating systems in one embodiment, and specialized applications $144_1$-$144_N$. Specialized applications $144_1$-$144_N$ are those applications that are required by each of the respective gateway components (120, 122, 124, 128) so that they may perform their respective functions. The particular mix of specialized applications 144 that are located at or available too each of the components of the gateway will generally depend on the functions performed by that component.

Figure 3:
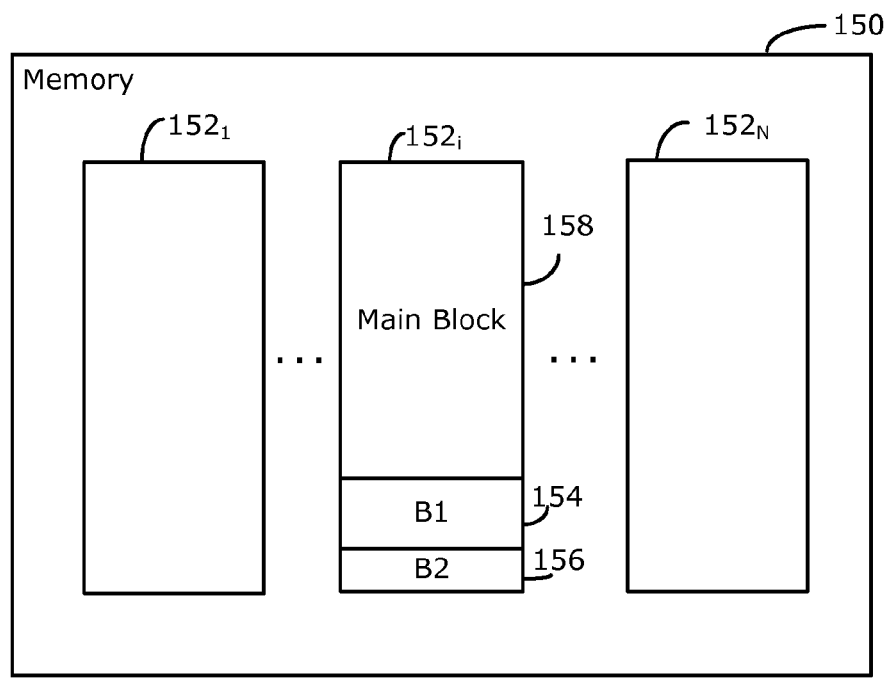
FIG. 3 is a block diagram representation of memory according to embodiments of the present disclosure.

As known in the art OS 142 is configured to coordinate and monitor the operation of specialized applications $144_1$-$144_N$, and to allocate resources for each of the specialized applications. One of the most important resources that OS 142 allocates among the specialized applications is transient memory, i.e. RAM 132. FIG. 3 illustrates in diagrammatic form a block of memory 150, which represents the portion of RAM 132 that the operating system 142 can allocate among specialized applications $144_1$-$144_N$. Typically, upon start up of an application, the operating system 142 books or allocates a sub-set or block of the memory 150 for the application. In FIG. 3, blocks $152_1$-$152_N$ represent memory blocks that have been allocated for specialized applications $144_1$-$144_N$, respectively. As known in the art, the physical memory used to implement each memory block 152 need not be consecutive physical memory locations in RAM 132, and successive data groups need not be stored in successive physical memory locations.

According to the present disclosure, software components 140 include a specialized application for managing low memory situations, namely low memory manager application 146. Although shown in FIG. 2 as a separate application the functionality of low memory manager 146 may, in some embodiments, be fully or partly integrated into one or more of the other specialized applications $144_1$-$144_N$, or into the operating system 142. The low memory manager 146 is configured to cause part of the memory allocated to all or selected specialized applications $144_1$-$144_N$ to be effectively held in reserve so that it can be used to support a specialized application during an occurrence of low memory, thus providing time for data backup or remedial steps to be carried out before the affected application crashes.

Figure 4:
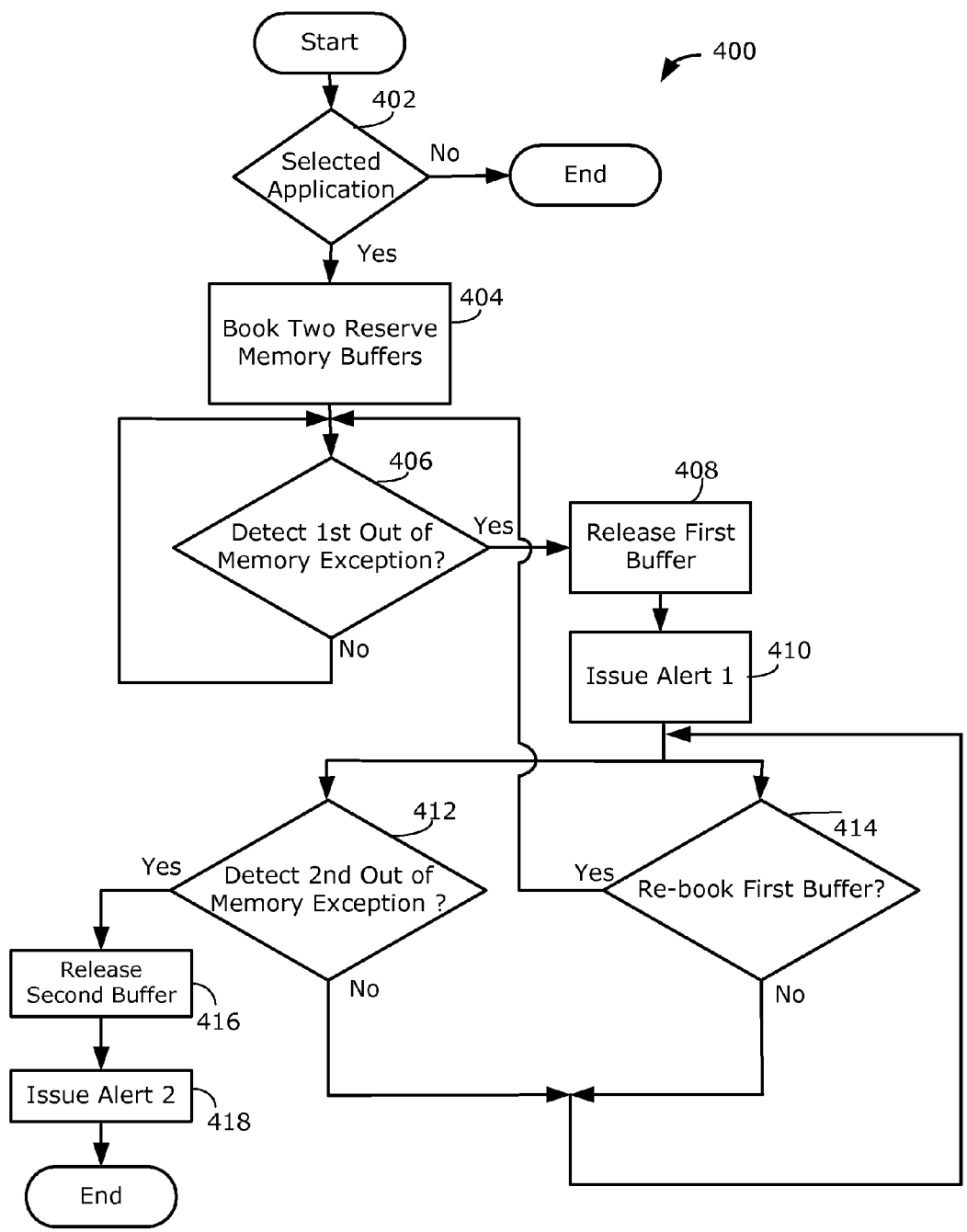
FIG. 4 is a flow diagram showing operation of a memory management process according to an embodiment of the present disclosure.

FIG. 4 illustrates, according to embodiments of the present disclosure, a process indicated generally by reference 400, taken by low memory manager 146 to manage low memory conditions of a specialized application 144i (where $1 \leq i \leq N$). As indicated in step 402, in embodiments where the low memory manager is a stand alone application or integrated into the operating system 142, it monitors all specialized applications that are started by the operating system 142 and determines if the specialized application being started (in this example, application 144i) has been pre-selected for low memory management, and if so performs the memory management functions set out below. In some embodiments, all specialized applications may be selected for low memory management, in which case step 402 may be omitted. In some embodiments, the low memory manager 146 may be a module of specialized application 144i, and be configured to automatically perform its memory management steps only in respect of its associated specialized application 144i.

If low memory management is to be performed in respect of specialized application 144i, then, as indicated in step 404, the low memory manager 146 instructs the operating system 142 to allocate reserve memory blocks for the specialized application 144i. As noted above, when the operating system 142 first starts specialized application 144i, it books or allocates a block of memory 152i (FIG. 3) for the application. In a Windows™ operating system embodiment, the memory block may be 2 GB, which is the maximum amount of memory that Windows™ can presently allocate to an application. According to embodiments of the present disclosure, in step 404 the low memory manager 146 requests the operating system 142 to book or allocate two reserve sub-blocks within memory block 152i such that it is broken up into three sub-blocks, namely a main block 158, and two reserve buffers B1 154 and B2 156. The main block 158 is made fully available for the normal operating requirements of specialized application 144i, but, from the perspective of both the operating system 142 and the specialized application 144i, the two reserve buffers B1 154 and B2 156 are booked up and unavailable until freed by the low memory manager 146 (as described below). As known in the art, the operating system 142 will typically divide memory into "pages" of predetermined size. Although low memory manager 146 books the reserve buffers B1 154 and B2 154 upon start up of the specialized application 144i, the reserve buffers are, in one example embodiment, not actually physically divided up into memory pages by the operating system until data is actually written to them, thereby reducing unnecessary processor activity.

In one embodiment, the reserve buffers B1 154 and B2 156 are relatively small compared to main block 158, with the second reserve buffer B2 156 being smaller than the first buffer B1 154. By way of non-limiting example, in one embodiment, the main block 158 may be approximately 88% of the memory block 152i that has been allocated for application 144i, the first reserve buffer B1 154 approximately 10% of the memory block 152i, and the second reserve buffer B22 156 approximately 2% of the memory block 152i. However, in various embodiments different relative buffer sizes are used, and in some embodiments the first and second reserve buffers are identical in size.

As specialized application 144i runs, it will use the main memory block 158 for its memory requirements. Application 144i and operating system 142 may employ various memory management techniques known in the art to manage usage of the memory within main block 158, such as caching data to hard drive 134.

As known in the art, operating system 142 monitors memory usage of specialized application 144i, and is configured to issue an out-of-memory exception in the event that the available memory for specialized application 144i falls below a predetermined threshold (which may be zero available memory). In many specialized applications, the out-of-memory exception results in an immediate or almost immediate crash of the specialized application, without sufficient warning for corrective or remedial action to be executed. The low memory manager 146 of the present disclosure provides a method by which warning of an impending out-of-memory problem can be provided sufficiently early to allow corrective or remedial action to be taken before the crash of an application.

More particularly, as indicated in step 406, the low memory manager 146 is configured to detect, as long as the specialized application 144i is running, any out-of-memory exceptions issued by the operating system 142 in respect of specialized application 144i. An out-of-memory exception will result when the available memory in main block 158 drops below the predetermined threshold. As indicated at step 408, upon detecting an out-of-memory exception issued by the operating system in respect of specialized application 144i, the low memory manager 146 instructs the operating system 142 to release the first reserve buffer B1 154, effectively integrating the memory of buffer B1 with the main block 158, thereby increasing, from the perspective of the specialized application 144i and the operating system 142, the amount of free memory available for use by the specialized application. The newly freed memory will in many cases delay, if not prevent altogether, an impending crash.

In addition to freeing the memory the low memory manager may, as indicated in step 410, also issue a first warning alert so that corrective or remedial action can be taken. In some embodiments, the first warning alert could be an audio and/or visual signal intended to alert a human operator of the condition. Additionally or alternatively, the first warning alert could be an electronic signal or a variable passed to a management application that is running on the affected computer. The management application could be a discrete specialized application, or could be a module of the affected specialized application, or a module of the low memory manager 146. In some embodiments, the first warning signal could be sent to a management application running on a remote computer to which the affected computer is connected by a network. For example, in an implementation where the low memory manager 146 is running on a wireless transport interface $128_k$ of distributed gateway 100, the first warning signal could be sent to a management application running on controller 122, which in turn may issue an alert for a human operator to investigate the problem. The management application on controller 122 could be configured to take corrective action, either automatically, or with the intervention of a human operator. For example, the management application on the controller 122 is in some embodiments configured to cause electronic traffic to be rerouted to other wireless transport interfaces 128 to relieve some of the demand on the affected wireless transport interface. In some embodiments, steps may be taken after the first warning signal to store information in memory 152*i* to a persistent storage.

Turning again to process 400, once the reserve buffer B1 154 is released, the low memory manager 146 waits to see if the operating system 142 issues a second out-of-memory exception in respect of specialized application 144*i* (step 412). While waiting for a second out-of-memory exception, the specialized application periodically attempts to re-reserve the first reserve buffer B1 154 (step 414)—if the memory usage level by the specialized application 144*i* drops down to a level that does not require reserve buffer B1 154 anymore, then the operating system 142 will allow the memory to be re-reserved by the low memory manager 146, otherwise the operating system 142 will not allow the memory to be released to the low memory manager 146. The frequency of the attempts by low memory manager 146 to re-reserve first buffer B1 154 is configurable in one embodiment of the present disclosure. In the event that the reserve buffer B1 154 is no longer needed and is re-reserved by the low memory manager 146 in step 414, the low memory manager 146 resets and returns to step 406 to wait for a new first occurrence of an out-of-memory exception.

Turning again to step 412, the operating system 142 will issue a second out-of-memory exception when the additional memory that came available due to release of the reserve buffer B1 154 is full. The occurrence of a second out-of-memory exception will typically indicate that any corrective action that was taken in response to the first warning alert has failed, or that the first warning alert has gone unheeded.

As indicated in step 416, in response to a second out-of-memory exception, the low memory manager 146 releases the second reserve buffer B2 156, effectively integrating the memory of buffer B2 with the main block 158 and the previously released first reserve buffer B1 154, thereby increasing, from the perspective of the specialized application 144*i* and the operating system 142, the amount of free memory available for use by the specialized application 144*i*. The newly released memory B2 156 preferably buys sufficient time for recovery supporting activity to take place prior to crashing of the affected application 144*i*—for example, time for selected information in the memory block 152*i* to be stored to a persistent storage location so that it can be retrieved at a later time.

As indicated in step 418, upon releasing the second reserve buffer, the low memory manager preferably issues a second warning alert to signal that a crash is pending. In some embodiments, the second warning alert is effectively a command to commence an automated shutdown of the specialized application 144*i*. Preferably, the second warning alert triggers recovery supporting activities to take place. In some embodiments, the second warning alert could be a signal or variable passed to another application or within an application located on the same computer as the affected application. Alternatively, or additionally, the second warning alert could be sent to a remotely located management application on another computer.

By way of non-limiting example, the affected specialized application 144*i* may be running on wireless transport interface $128_k$ and responsible for sending outgoing messages to and receiving incoming messages from mobile devices 106. The specialized application maintains a pending message buffer within memory block 152*i* that includes pending outgoing messages that are waiting to be sent out to mobile devices 106, and pending incoming messages that have been received from mobile devices 106 but not yet processed by the gateway 100. The pending messages may include, among other things, status messages such as error codes and acknowledgements, and conventional email messages. Delivery of some of the pending messages in the pending message buffer may be critical in order to avoid "lost" messages, namely messages in which an originating device such as a mobile device 106 is left with incorrect or ambiguous information as to the status of an email message that was sent from the device. Accordingly, in the event of an impeding crash of the specialized application 144*i*, it is desirable to serialize to a persistent storage at least the critical pending messages in memory block 152*i* that are required to ultimately be sent to avoid lost messages.

In the presently described example, the specialized application 144*i* includes a shutdown manager 160 that is configured to receive the second warning alert issued in step 418, and subsequently begin a shutdown routine that includes, among other things, serializing to persistent storage any critical messages that are stored in memory block 152*i*, thereby allowing the critical pending messages to be retrieved and sent at a later time. The messages could be serialized to a local persistent storage of the computer on which the affected application is running, or to database 124. The second warning alert issued in step 418 is preferably also provided, directly or indirectly, to the controller 132 so that it can cause all traffic to be rerouted away from the wireless transport interface $128_k$ that is running the crashing application 144*i*, and designate one or more other wireless transport interfaces 128 to take over the traffic and also to retrieve and send the serialized critical messages.

It will thus be appreciated that the low memory management process of the present disclosure provides advanced warning of impending crash of an application due to an out-of-memory situation, thus allowing corrective actions to be taken to try and prevent the crash and also recovery supporting actions to be taken so that critical data is not lost if a crash occurs. In the example embodiment described above, two reserve buffers are reserved from the memory available to the application. When an out-of-memory exception is issued, the first reserve buffer is released, and a warning issued so that either or both automated and human controlled investigations and corrective actions can occur. If the warning does not result in a successful fix, then a second out-of-memory exception is received, causing the second buffer to be released, and the commencement of a controlled shutdown of the application during which critical data is stored to persistent memory. The low memory manager 146 relies on out-of-memory exceptions issued by the operating system 142, rather than attempting to directly and continuously monitor memory usage itself. As a result, low memory manager 146 uses relatively few processing resources of the computer upon which it is implemented.

In some embodiments, more or less than two reserve buffers may be used.

In one embodiment, there is provided a computer program product having a computer-readable medium tangibly embodying computer executable instructions for implementing embodiments of the present disclosure described above. The computer readable medium could, among other things be a storage medium such as a magnetic medium or an optical medium, or could be a communications medium such as an electrical or optical signal onto which the computer executable instructions have been modulated.

The above-described embodiments of the present disclosure are intended to be examples only. Alterations, modifications and variations may be effected to the particular embodiments by those skilled in the art without departing from the scope of the present disclosure, which is defined by the claims appended hereto.

The invention claimed is:

1. A method for managing low memory in a first computing device having a processor for executing an operating system and an application, and a memory available to the operating system and application, the operating system being configured to issue a first out-of-memory exception in the event that available memory for the application falls below a first pre-determined threshold, the method comprising:
   reserving, for future use by the application, within a block of memory a first reserve buffer that is unavailable for any use until released; and
   releasing the first reserve buffer for use by the application upon detecting the first out-of-memory exception generated by the operating system.

2. The method of claim 1, further comprising generating a first warning alert upon releasing the first reserve buffer.

3. The method of claim 2, wherein the first computing device is an interface for exchanging electronic messages with mobile devices in a wireless communications network, the method further comprising:
   upon detecting the first warning alert, rerouting electronic messages away from the first computing device to a further computing device connected to the first computing device via a communications network.

4. The method of claim 1, further comprising storing selected information from the block of memory to a persistent storage subsequent to detecting the first out-of-memory exception generated by the operating system.

5. The method of claim 1, further comprising, after releasing the first reserve buffer, attempting to re-reserve the first reserve buffer.

6. The method of claim 1, wherein the operating system is configured to issue a second out-of-memory exception in the event that the available memory for the application falls below a second pre-determined limit, the method further comprising:
   reserving within the block of memory a second reserve buffer that is unavailable until released; and
   releasing the second reserve buffer for use by the application if the first reserve buffer is released and a second out-of-memory exception generated by the operating system is detected.

7. The method of claim 6, where operating system is configured to issue the second out-of-memory exception when the first reserve buffer is full.

8. The method of claim 6, further comprising generating a first warning alert upon releasing the first reserve buffer and generating a second warning alert upon releasing the second reserve buffer.

9. The method of claim 8, further comprising, upon detecting the second warning alert, commencing an automated shutdown of the application.

10. The method of claim 8, further comprising, storing selected information from the block of memory to a persistent storage subsequent to detecting the second warning alert.

11. The method of claim 8, wherein the first computing device is an interface for exchanging electronic messages with mobile devices in a wireless communications network, the method further comprising:
   upon detecting the second warning alert, rerouting electronic messages away from the first computing device to a further computing device connected to the first computing device via a communications network.

12. The method of claim 11, wherein the first computing device is an interface for exchanging electronic messages with mobile devices in a wireless communications network, wherein the application maintains a pending message buffer within the block of memory for storing pending outgoing messages and pending incoming messages, and wherein the storing of selected information comprises storing any pending outgoing messages and pending incoming messages in the pending message buffer to a persistent storage subsequent to detecting the second warning alert.

13. The method of claim 12, wherein the pending message buffer contains critical pending messages for which originating mobile devices have incorrect or ambiguous status information regarding whether the critical pending messages have sent, wherein the storing of selected information comprises storing the critical pending messages in the pending message buffer to a persistent storage subsequent to detecting the second warning alert.

14. A system for managing low memory on a first computing device having a processor for executing an operating system and an application, and a memory available to the operating system and application, the operating system being configured to issue a first out-of-memory exception in the event that available memory for the application falls below a first pre-determined threshold, the system comprising:
   a low memory manager configured to reserve, for future use by the application, within a block of memory a first reserve buffer that is unavailable for any use until released, and release the first reserve buffer for use by the application upon detecting the first out-of-memory exception generated by the operating system.

15. The system of claim 14, wherein the low memory manager is configured to generate a first warning alert upon releasing the first reserve buffer.

16. The system of claim 15, wherein the first computing device is an interface for exchanging electronic messages with mobile devices in a wireless communications network, the system further comprising:
   a further computing device connected to the first computing device via a communications network, the further computing device being configured to reroute messages away from the first computing device in response to detecting the first warning alert.

17. The system of claim 14, wherein the low memory manager is configured to, after releasing the first reserve buffer, attempt to re-reserve the first reserve buffer.

18. The system of claim 14, wherein the operating system of the first computing device is configured to issue a second out-of-memory exception when the first reserve buffer is full, and
   wherein the low memory manager is configured to: reserve within the block of memory a second reserve buffer that is unavailable until released; and release the second reserve buffer for use by the application if the first reserve buffer is released and a second out-of-memory exception generated by the operating system if the first reserve buffer is detected.

19. The system of claim 18, wherein the low memory manager is configured to generate a first warning alert upon releasing the first reserve buffer and to generate a second warning alert upon releasing the second reserve buffer, the system further comprising:
   a further computing device connected to the first computing device via a communications network, the further computing device being configured to reroute messages away from the first computing device in response to detecting the first warning alert; and
   a shutdown manager for commencing an automated shutdown of the application upon detecting the second warning alert.

20. The system of claim 18, wherein the shutdown manager is configured to store selected information from the block of memory to a persistent storage in response to detecting the second warning alert.

21. The system of claim 20, wherein the first computing device is an interface for exchanging electronic messages with mobile devices in a wireless communication network, wherein the application maintains a pending message buffer within the block of memory for storing pending outgoing messages and pending incoming messages, and
wherein the shutdown manager is configured to store pending outgoing messages and pending incoming messages in the pending message buffer to a persistent storage subsequent to detecting the second warning alert.

22. The system of claim 21, wherein the pending message buffer contains critical pending messages for which originating mobile devices have incorrect or ambiguous status information regarding whether the critical pending messages have sent, and
wherein the shutdown manager is configured to store critical pending messages in the pending message buffer to a persistent storage subsequent to detecting the second warning alert.

23. A computer program product comprising a computer readable storage medium having stored thereon computer program instructions for managing low memory in a first computing device having a processor for executing an operating system and an application, and a memory available to the operating system and application, the operating system being configured to issue a first out-of-memory exception in the event that available memory for the application falls below a first pre-determined threshold, the computer executable instructions comprising instructions for:
reserving, for future use by the application, within a block of memory a first reserve buffer that is unavailable for any use until released;
releasing the first reserve buffer for use by the application upon detecting the first out-of-memory exception.

24. The computer program product of claim 23, further comprising instructions for:
reserving within the block of memory a second reserve buffer that is unavailable until released; and
releasing the second reserve buffer for use by the application if the first reserve buffer is released and a second out-of-memory exception generated by the operating system is detected.

25. The computer program product of claim 24, further comprising instructions for generating a first warning alert upon releasing the first reserve buffer and generating a second warning alert upon releasing the second reserve buffer.

* * * * *